United States Patent [19]
Lawless et al.

[11] Patent Number: 5,371,514
[45] Date of Patent: Dec. 6, 1994

[54] METHOD AND APPARATUS FOR DETERMINING THE DRAWING PRIMITIVES THAT ARE VISIBLE IN A PICK APERTURE OF A GRAPHICS SYSTEM

[75] Inventors: John J. Lawless, Red Hook; David W. Li, Kingston; David C. Tannenbaum, Hurley, all of N.Y.

[73] Assignee: International Business Machines Corporation, Armonk, N.Y.

[21] Appl. No.: 966,126

[22] Filed: Oct. 23, 1992

Related U.S. Application Data

[63] Continuation of Ser. No. 701,255, May 16, 1991, abandoned.

[51] Int. Cl.⁵ .............................................. G09G 5/00
[52] U.S. Cl. .................................... 345/145; 395/135
[58] Field of Search ............... 340/709, 721, 724, 729, 340/706, 734; 395/133, 119, 121, 155, 122, 134, 135; 358/183, 22; 345/118, 113, 145

[56] References Cited

U.S. PATENT DOCUMENTS

| | | | |
|---|---|---|---|
| 4,451,895 | 5/1984 | Sliwkowski | 395/155 |
| 4,475,104 | 10/1984 | Shen | 340/729 |
| 4,609,917 | 9/1986 | Shen | 340/729 |
| 4,731,609 | 3/1988 | Reynolds et al. | 340/709 |
| 4,805,127 | 2/1989 | Hata et al. | 395/134 |
| 4,809,201 | 2/1989 | Keklak | 395/135 |
| 4,847,605 | 7/1989 | Callahan et al. | 340/709 |
| 4,870,599 | 9/1989 | Hempel et al. | 395/131 |
| 4,924,414 | 5/1990 | Ueda | 395/121 |
| 4,939,635 | 7/1990 | Seki et al. | 364/191 |
| 4,939,672 | 7/1990 | Meadows | 395/159 |
| 4,941,111 | 7/1990 | Sfarti | 395/157 |
| 4,958,147 | 9/1990 | Kanema et al. | 340/729 |
| 4,977,518 | 12/1990 | Bonnet et al. | 340/709 |
| 4,982,345 | 1/1991 | Callahan et al. | 395/155 |
| 5,086,496 | 2/1992 | Mulmuley | 395/121 |
| 5,175,805 | 12/1992 | Carrie | 395/121 |

FOREIGN PATENT DOCUMENTS

| | | | |
|---|---|---|---|
| 0100798 | 2/1984 | European Pat. Off. | G06F 3/037 |
| 0318154 | 5/1989 | European Pat. Off. | G06F 3/033 |

OTHER PUBLICATIONS

"Hidden Line/Hidden Surface Removal (HLHSR)", The graPHIGS Programming Interface Understanding Concepts, pp. 14-14-16-14.

*Primary Examiner*—Tommy P. Chin
*Assistant Examiner*—A Au
*Attorney, Agent, or Firm*—Mark S. Walker; William A. Kinnaman, Jr.

[57] ABSTRACT

A multiple-pass system for determining the primitives that are visible in a predetermined pick aperture for a "visible pick" operation. On the first pass, the primitives contained within the pick aperture and thus potentially visible are selected, and each selected primitive is assigned a pick index as an identifier. On the second pass, the pick indices of the selected primitives are rendered to a temporary frame buffer area, using a Z-buffer for hidden surface removal so that only the pick indices of the primitives visible within the pick aperture are stored in the corresponding frame buffer portion. On the third pass, the frame buffer portion corresponding to the pick aperture is read to determine the pick indices of the visible primitives. This information is then used to report back to the host the picked primitives.

16 Claims, 8 Drawing Sheets

METHOD AND APPARATUS FOR DETERMINING THE DRAWING PRIMITIVES THAT ARE VISIBLE IN A PICK APERTURE OF A GRAPHICS SYSTEM

CROSS-REFERENCE TO RELATED APPLICATION

This application is a continuation of application Ser. No. 07/701,255, filed May 16, 1991, now abandoned.

BACKGROUND OF THE INVENTION

1. Field of the Invention

This invention relates to a method and apparatus for generating pick information in a graphics system and more particularly to a method and apparatus for generating visible pick information in such a system.

2. Description of the Related Art

Interactive graphics systems have two general functions, an output capability for rendering pictures and input facilities for providing interactivity. An essential part of such interactivity in many graphics system is the pick procedure, in which a user selects an object appearing on the display, such as an icon or a text display, to provide input to an application. Typically, the user positions a cursor over a portion of the display image, using a mouse or other pointing device, and presses an actuator associated with the device to make the desired selection. Picking is described in such references as Callahan et al. U.S. Pat. No. 4,847,605, entitled "Picking in a Graphics System"; Hempel et al. U.S. Pat. No. 4,870,599, entitled "Traversal Method for a Graphics Display System"; Ebbers et al, application Ser. No. 07/425,781, filed Oct. 25, 1989, entitled "Picking Function for a Pipeline Graphics System Using Hierarchical Graphics Structures", the EPO counterpart of which was published May 2, 1991, as Publication No. 425 173; and Callahan et al. European Patent Publication No. 0 318 154, entitled "A Method of Operating a Computer Graphics System", all assigned to the assignee herein, the specifications of which are incorporated herein by reference.

With the advent of real-time hidden-line/hidden-surface removal, traditional picking mechanisms are now insufficient. This is because such picking mechanisms typically use a two-dimensional (2D) position test, in which a primitive is picked if the object that it represents passes through a predetermined pick aperture, even if the object is hidden in the relevant area by other objects. Such a simple geometric test can lead to unintended results, such as where a user intending to pick an aircraft fuselage on a screen also picks a passenger seat that is entirely hidden from view. It is therefore desirable to provide additional picking selectivity such that only visible entities may be picked.

SUMMARY OF THE INVENTION

The present invention relates to a method and apparatus that provides graphics applications with pick information on display-screen-visible drawing primitives. Specifically, the pickability requirement has been increased from a simple 2D position test to include a visibility test. This provides a significant improvement over currently available pick notification methods.

More particularly, the invention contemplates a method and apparatus for determining the primitives that are visible in the pick aperture of a graphics system in which drawing primitives are converted to pixel data for display as a pixel image by a raster-scan device. In accordance with the invention, each primitive has a unique value, or identifier, associated therewith. The primitives are first rendered (i.e., converted to pixel data) in the usual manner except that the pixel data includes the primitive identifiers instead of or in addition to the normal color values. The primitive identifiers are written to the frame buffer or other set of pixel storage locations coextensive with the pick aperture, preferably using a Z-buffer for hidden-line/hidden surface removal, so that only those identifiers corresponding to primitives that are visible in the pick aperture remain stored at the end of the pass. The identifiers stored in the pick aperture locations are then read to determine the primitives that are visible in the pick aperture.

Preferably, to reduce the length of the primitive identifiers, a preliminary pass is made in which only those primitives that pass through the pick aperture in a geometric sense (i.e., without regard to whether they are hidden by other primitives) are selected. These selected primitives are then assigned unique identifiers (also referred to herein as pick indices) which are stored in the pick aperture locations on a subsequent pass.

DESCRIPTION OF THE PREFERRED EMBODIMENTS

1. Introduction

The disclosed pick procedure provides a method for notifying a graphics application about which drawing primitives pass through a pick aperture. There are three pick notification modes that report the following:

1. First drawing primitive through pick aperture,
2. Last drawing primitive through pick aperture, and
3. All drawing primitives through the pick aperture.

Drawing primitives may be hidden from view by the order in which they are rendered. Primitives rendered last may hide what was drawn first. Also, Z-buffering may eliminate a drawing primitive or pieces of it from being rendered at all. To be more useful to the graphics application and the end user, the pick notification needs to provide a way of reporting only what is actually visible on the display screen and not report those primitives that are hidden or Z-buffered. This is a major requirement for high function graphics systems.

2. First Embodiment

Figure 1:
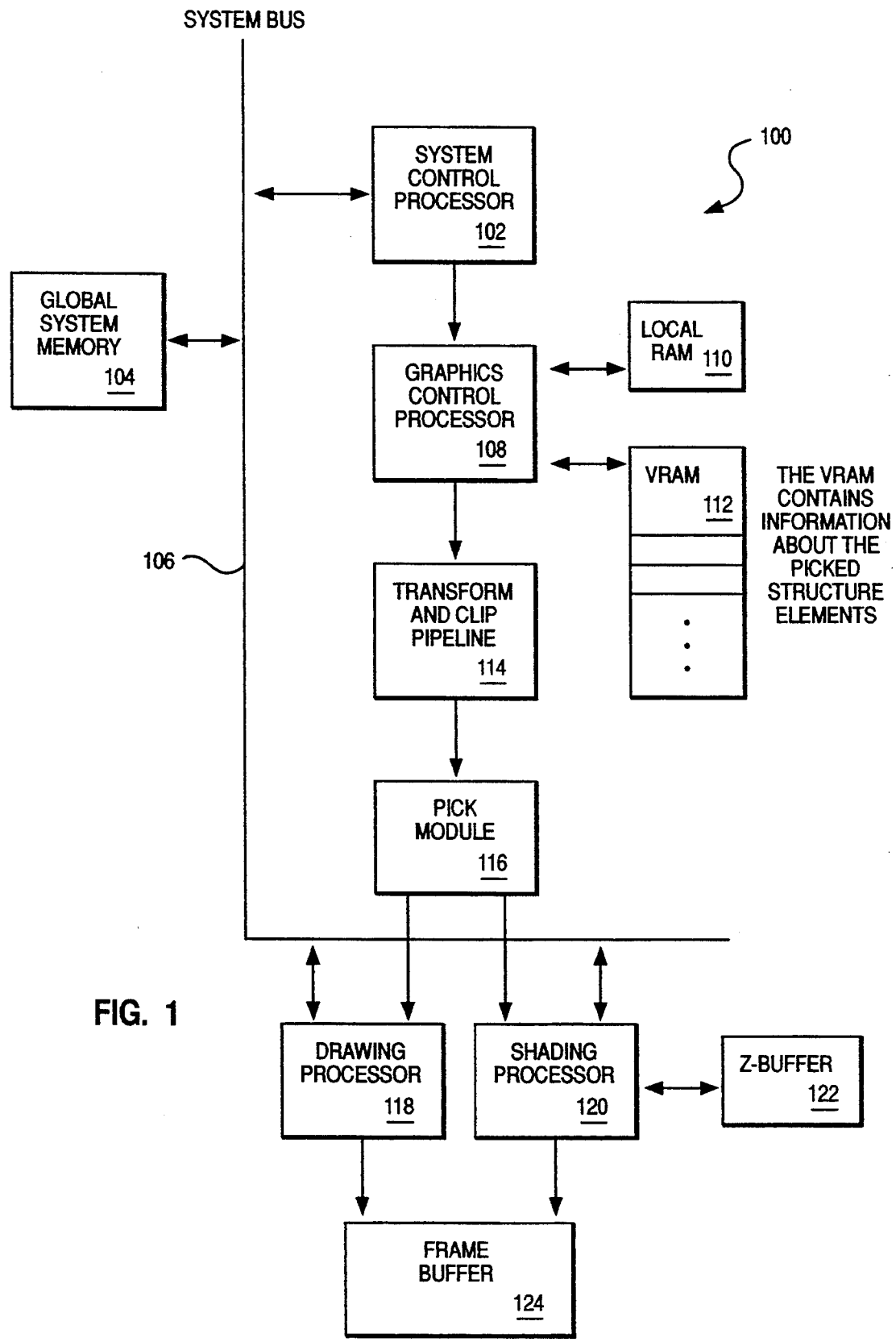
FIG. 1 is a schematic block diagram of a graphics system incorporating the present invention.

The overall architecture for the first embodiment is depicted in FIG. 1. As shown in that figure, a graphics system 100 incorporating the present invention includes a system control processor (SCP) 102, which is coupled to a global system memory 104 via a bus 106. System memory 104 consists of random access memory (RAM) for storing a display list containing the definitions of graphics entities, as well as any additional attributes (e.g., colors) and transformation matrices required to specify how and where those entities are to appear on a display screen. This information is produced by an application running on a general-purpose host computer (not shown) using appropriate communications facilities (not shown).

System control processor 102 is also coupled to a graphics control processor (GCP) 108. Graphics control processor 108 has associated with it a local memory 110 consisting of RAM and a video RAM (VRAM) 112 for storing information about picked primitives, among other uses. Graphics control processor 108 selects an individual graphics entity, as stored in system memory 104, and passes it on to a transformation processor (TrP) 114 (also referred to in this specification as a transformation pipeline) for conversion to a form which is supported by a drawing processor (DrP) 118 or by a shading processor (ShP) 120 coupled to the transformation processor through a pick module 116. Pick module 116 intercepts the output of transformation processor 114 destined for drawing processor 118 to determine whether a geometric pick (i.e., a pick using the conventional 2D position test) has been made. Processors 118 and 120 are coupled to a frame buffer 124 as well as to the bus 106.

Frame buffer 124 is used to store a rasterized pixel image generated by drawing processor 118 or shading processor 120. Shading processor 120 is used in a conventional manner to interpolate color and depth information for 3D rendering or for polygon shading, while drawing processor 120 is used for 2D rendering where shading is not required. A Z-buffer 122 associated with shading processor 120 stores depth information for each screen pixel. Besides being used in a conventional manner to render and store graphics data, shading processor 120, Z-buffer 122 and frame buffer 124 are used in the present invention to generate visible pick information.

Figure 6:
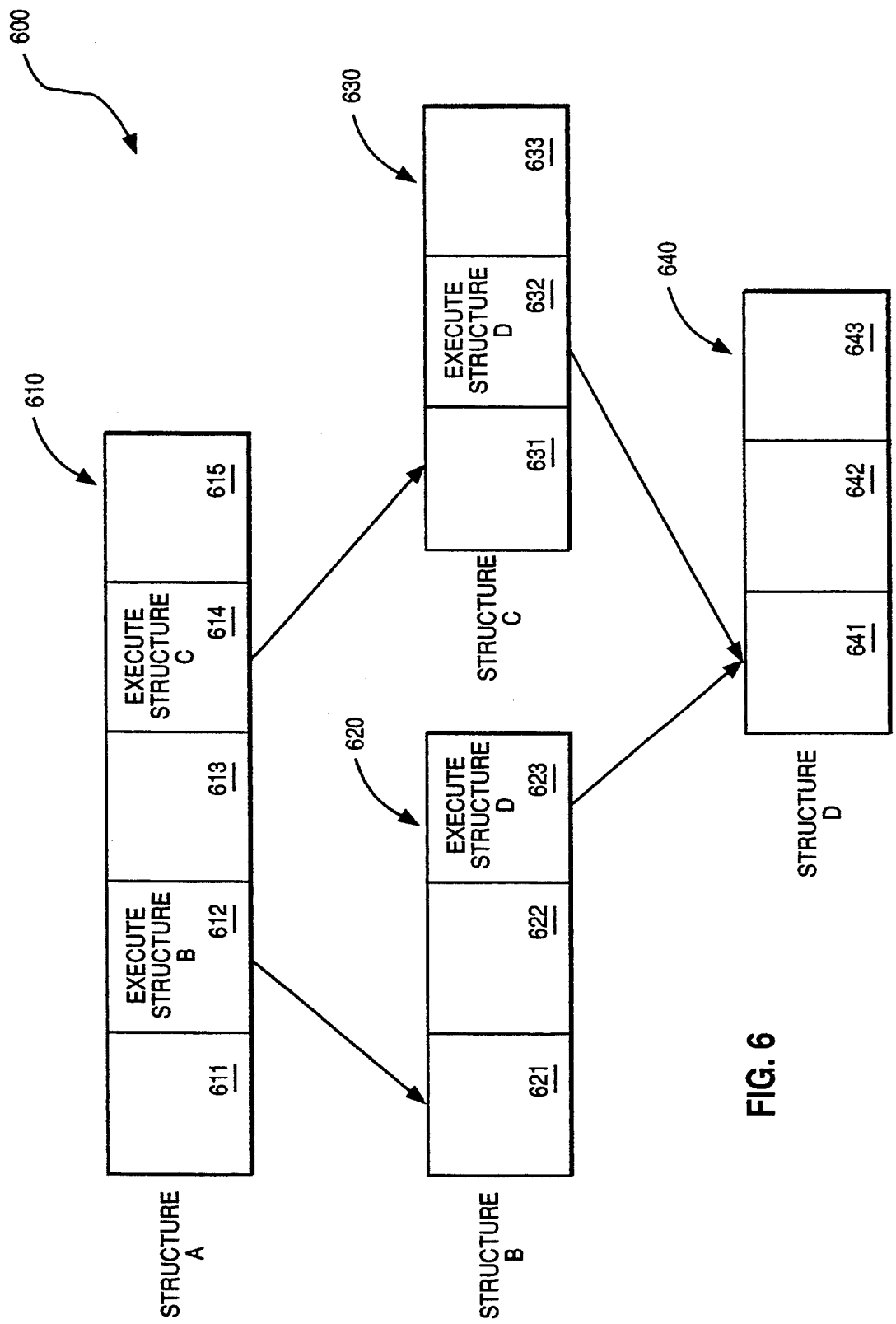
FIG. 6 is a block diagram of the data structure used for storing primitives in system memory.

As noted above, system memory 104 stores a display list of the graphics entities, or primitives, that are rendered by processors 114, 118 and 120 and stored in the frame buffer 124 for display. As shown in FIG. 6, this list is organized as a hierarchical network 600 containing structures A-D (610-640), each of which consists of one or more structure elements. Thus, structure A (610) contains structure elements 611-615, structure B (620) contains structure elements 621-623, structure G (630) contains structure elements 631-633, and structure D (640) contains structure elements 641-643. Structure A may correspond, for example, to a chair, structures B and C may correspond to two legs of the chair, with positional and other information specific to the two legs, and structure D may contain common information about the two legs.

During traversal, a structure is processed element by element, from left to right as viewed in FIG. 6. If the element is an execute structure command, as in the case of elements 612, 614, 623 and 632, processing jumps to the structure referred to, which is traversed in a similar manner from left to right (including processing of additional execute structure commands) before returning to the parent structure. In this particular example, structure A is a root structure, while structures B through D are substructures invoked (directly or indirectly) by the root structure A. Although the details of the structure traversal do not as such form part of the present invention, further information may be found in numerous publications describing the proposed standard PHIGS (Programmer's Hierarchical Interactive Graphics Standard), as well as in the above-identified application of Ebbers et al.

Figure 2:
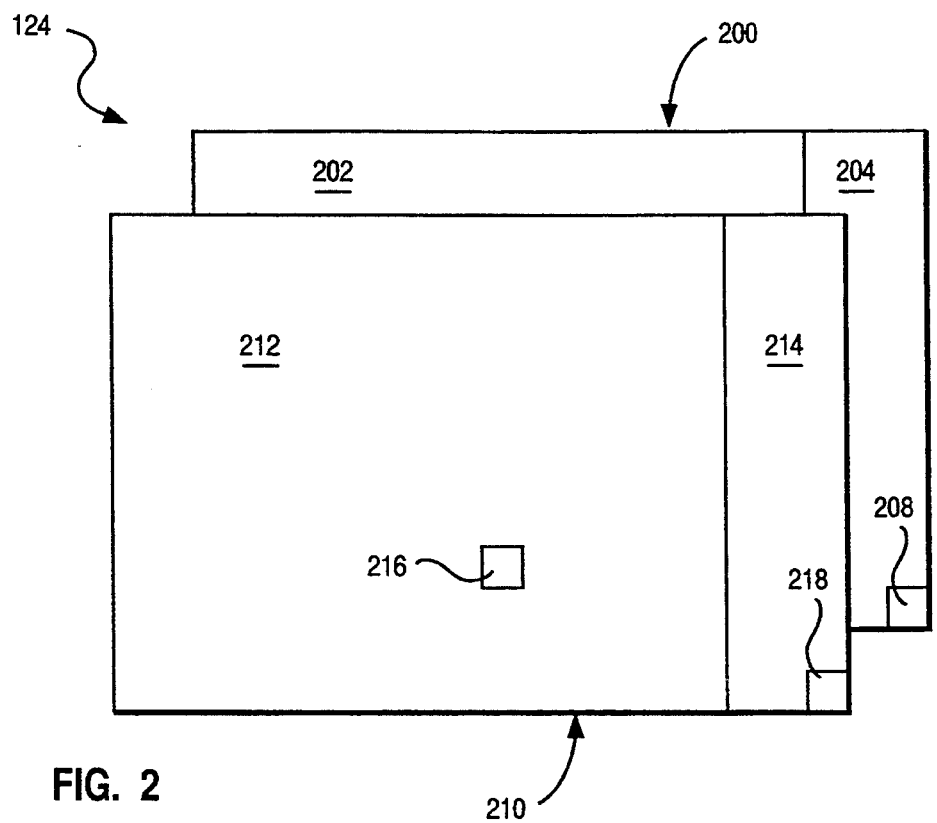
FIG. 2 is a schematic diagram of the frame buffer of the system shown in FIG. 1.

Referring to FIG. 2, frame buffer 124 comprises a first frame buffer portion 200 and a second frame buffer portion 210, each of which stores pixel data for an entire screen (1280×1024 pixels in the embodiment shown). (FIG. 2 is drawn from the standpoint of the screen coordinates, and does not represent the actual mapping to row and column addresses in the frame buffer 124, which may be accomplished in a variety of ways not relevant to the present invention.) As is conventional in the art, one frame buffer portion 200, 210 serves as the active frame buffer portion used to refresh the display (not shown), while the other portion serves as an inactive or background frame buffer portion which may be updated, but is not currently used to refresh the display. Either frame buffer portion 200, 210 may change over from being an active portion to an inactive frame buffer portion, or vice versa, in accordance with the needs of the system 100; the particular manner in which this changeover is accomplished is not relevant to the present invention. In the discussion that follows, it will be assumed that frame buffer portion 200 is the active portion used to refresh the display, while frame buffer portion 210 is the inactive portion, which is used to generate visible pick information in accordance with the present invention.

Each frame buffer portion 200, 210 in turn consists of an on-screen portion 202, 212 and an off-screen portion 204, 214. On-screen portions 202, 212 store the pixel data that is actually displayed when the corresponding frame buffer portions 200, 210 are active, while off-screen portions 204, 214 are used for such ancillary tasks as storing hatch patterns, fonts and the like.

As is conventional in the art, a user picks a displayed object on the screen by using a pick device, such as a mouse (not shown), to position a pick window or aperture over the object being picked. Thus, in FIG. 2, a pick aperture 216 is shown in the on-screen portion 212 of the background frame buffer 210. The corresponding pick aperture in the on-screen portion 202 of the active buffer 200 is similarly positioned, but not shown in FIG. 2. Pick aperture 216 may be any suitable size, such as a square of 16×16 pixels.

As will be described below, the background portion 210 is used to generate pick data by writing pick indices, rather than the actual color values of the primitives, to the corresponding pixels in the pick aperture 216. To avoid permanently corrupting the contents of the background portion 210 of the frame buffer 124, the color values stored in the pick aperture 216 are stored in a portion 218 of the corresponding off-screen save area 214 so that they may be restored when the pick process is complete. (A similar area 208 is provided in the off-screen area 204 of frame buffer portion 200 for use when that portion becomes the background portion). This transfer from the pick aperture 216 to the off-screen save area 218 may be accomplished in any suitable manner, such as by a BitBLT (bit block transfer) operation, well known in the art.

Figure 3:
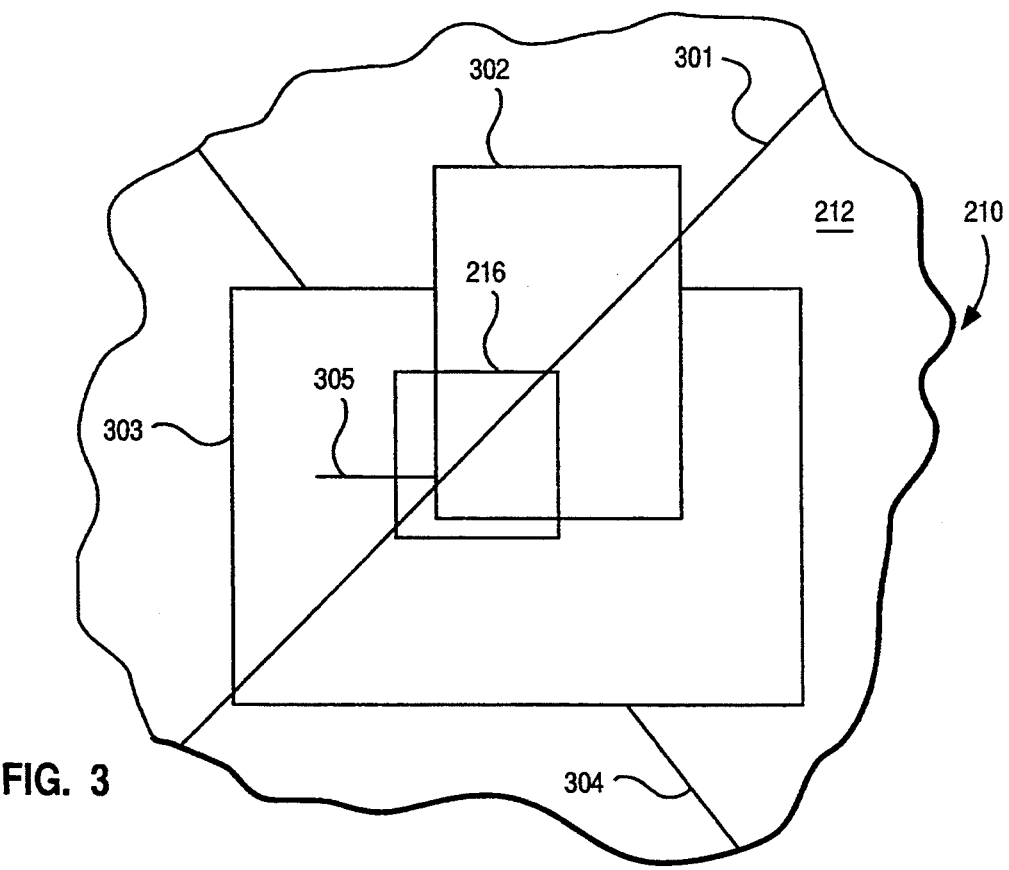
FIG. 3 is a view of a portion of the display screen that includes the pick aperture.

FIG. 3 shows a portion of the screen (as stored in the on-screen area 212 of background frame buffer 210) containing the pick aperture 216. As shown in that figure, the screen portion may display objects corresponding to graphics primitives 301-305. Of these primitives, 301, 304 and 305 are line segments while 302 and 303 are filled rectangular polygons. During the rendering process, each primitive is rasterized, i.e., converted to a set of pixels that are written to the frame buffer 124 and displayed if not hidden by another primitive. To determine whether the pixels are written to the frame buffer 124 and displayed, each pixel associated with a primitive 301-305 is assigned a depth value. For the purpose of this disclosure it will be assumed that increasing depth values represent positions closer to the viewer (as represented by a viewpoint), although the opposite convention could be used if desired. Initially, all pixel locations in the Z-buffer 122 and frame buffer are set to zero. For each pixel of a primitive, both the corresponding color value and the depth value are generated. If the generated depth value is greater than the depth value currently stored in the Z-buffer 122 for that pixel location, both the frame buffer 124 and the Z-buffer are updated, since the newly generated pixel represents an object that is closer to the viewer than the object currently represented at that location in the frame buffer and Z-buffer. If, on the other hand, the generated depth value is less than the depth value currently stored in the Z-buffer 122 for that pixel location, neither the frame buffer 124 nor the Z-buffer are updated, since the newly generated pixel represents an object that is farther from the viewer than the object currently represented at that location in the frame buffer and Z-buffer, and thus hidden from view at that location by the nearer object.

As a concrete example of this, referring still to FIG. 3, assume that the pixels associated with primitives 301-305 have the following depth values:

| Primitive | Depth Value |
| --- | --- |
| 301 | 5 |
| 302 | 4 |
| 303 | 2 |
| 304 | 1 |
| 305 | 3 |

As a result of this assignment of depth values, portions of primitives 302-305 will be hidden from display, with the result shown in FIG. 3. (Primitive 301 is not hidden because it is closer to the viewer than any of the other primitives 302-305.) Depending on the order in which the primitives are rendered, the hidden portions of primitives 302-305 are either not written to the Z-buffer 122 and frame buffer 124 in the first place or, if written, are overwritten by pixels from subsequently rendered primitives with depth values representing positions closer to the viewer.

The foregoing description summarizes the conventional technique of hidden-line/hidden-surface removal (HLHSR) using a Z-buffer. As noted above in the background portion, a problem arises when conventional pick procedures are used to identify primitives, some of which may be invisible in the pick aperture because of HLHSR. Thus, referring still to FIG. 3, all of the primitives 301-305 pass through the pick aperture 216 in the sense that pixels generated in the rendering process lie within the boundaries of the pick aperture. However, because of the presence of other primitives in the pick aperture 216, certain primitives may be invisible in the pick aperture, as is primitive 304 in the case illustrated. A user manipulating a pick device typically intends to pick only those primitives that are actually visible in the pick aperture 216. However, a simple two-dimensional position test that does not take visibility into account will pick primitive 304, which is invisible in the pick aperture 216, along with the visible primitives 301-303 and 305.

The disclosed method for visible pick determination is implemented as a three-stage process. The first two stages are used to produce a pattern in the frame buffer 124. The third pass reads the frame buffer 124 and returns the pick information. The first two passes have been separated in the disclosed embodiments to permit the method to work on the existing hardware of system 100. In general, however, only one pass is necessary to form the frame buffer pattern.

In its three-pass form, the visible pick procedure is as follows:

a. First Pass

Figure 4:
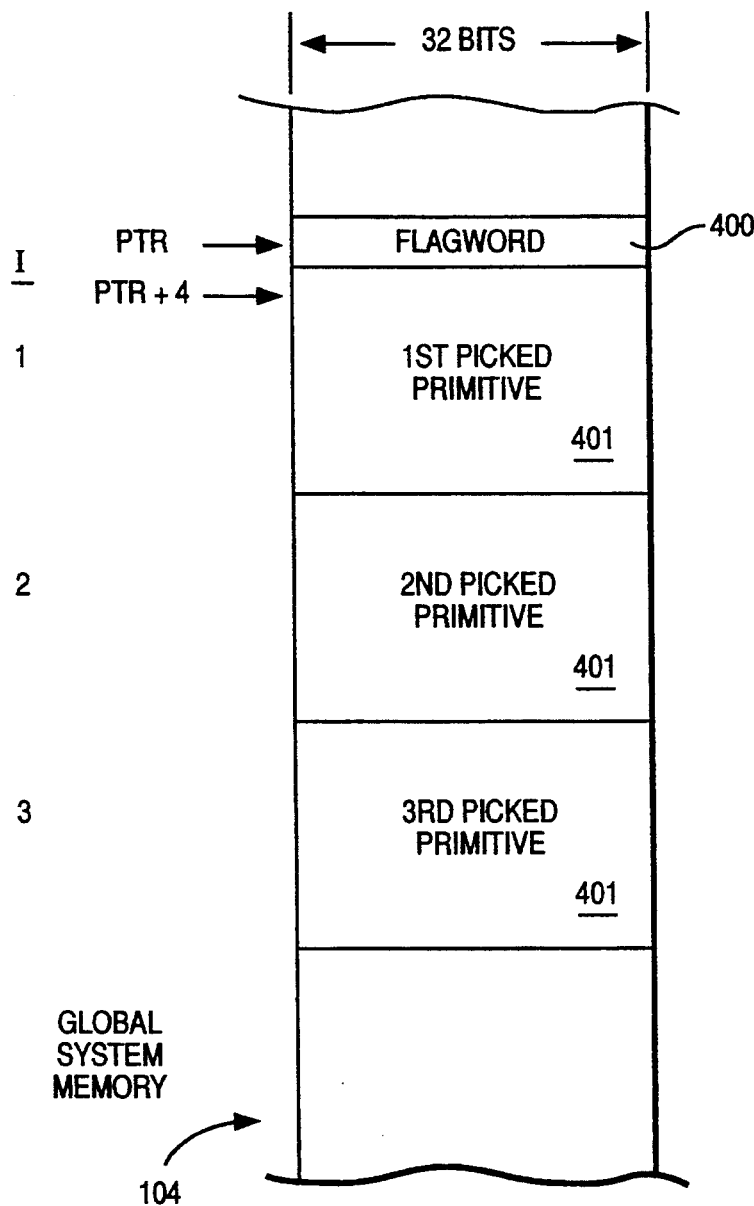
FIG. 4 is a block diagram of the data structure created in system memory on the first pass in one embodiment of the present invention.

Referring to FIGS. 1 and 4, the system control processor (SCP) 102 initiates the first pass by interrupting the graphics control processor (GCP) 108 with a "start visible pick traversal" interrupt and an address pointer PTR (FIG. 4) to a location 400 in system memory 104. The graphics control processor 108 stores the pick path data for all picks in pick path data blocks 401, up to a maximum of 32, starting at the address PTR+4 in system memory 104. The drawing processor 118 later stops the pick flagword at location 400.

Figure 5:
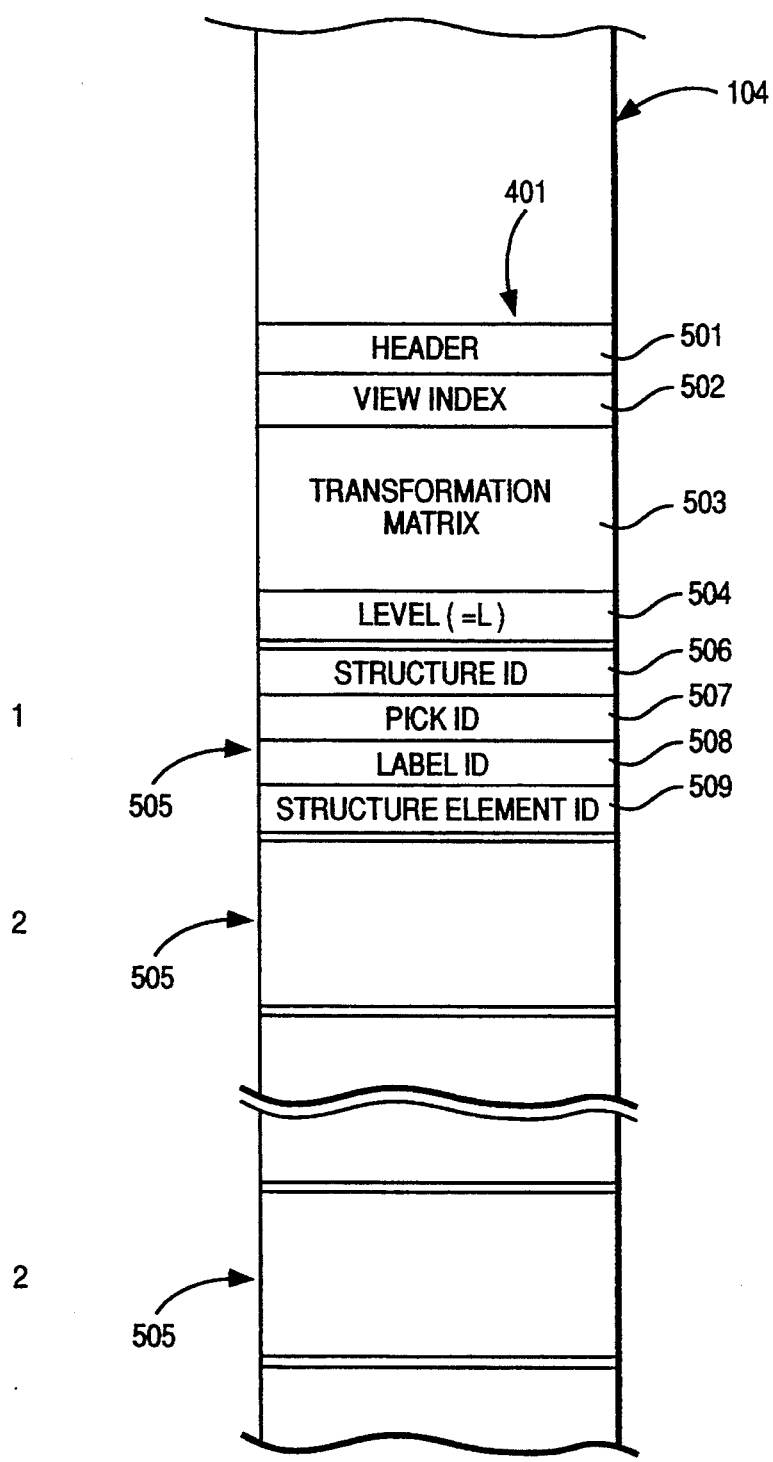
FIG. 5 is a block diagram with further details of the data structure shown in FIG. 4.

Referring now also to FIG. 5, the pick path data blocks 401 following the flagword 400 are organized as follows:

1. Header 501 (number of bytes in this block) (1 integer).
2. View index 502 (0 to 63) (1 integer).
3. Composite modeling transformation matrices 503 (16 floating point numbers).
4. Level L of pick path depth 504 (> =1) (1 integer).
5. Pick path data for the number L of levels 505 indicated by the quantity stored at location 504.

The pick path data for each level 505 from the bottom level to the top level contains:

1. Structure ID 506 (1 integer).
2. Pick ID 507 (1 integer).
3. Label ID 508 (1 integer).
4. Structure element number 509 (1 integer).

The significance Of these quantities, while not forming a part of the present invention, is explained in the Ebbers et al. application identified above. The pick path data stored in blocks 401 is used to report pick information back to an application.

Each pick path data block 401 corresponds to a primitive (more particularly, a structure element such as shown in FIG. 6) that is picked on the first traversal because the corresponding object passes through the pick aperture 216. Each block 401 is assigned a pick index I, which may range between 1 and 32 in the embodiment shown.

For the first and second passes, detectability (i.e. whether the primitive is to be reported back to the application) is ignored. Although a drawing primitive may not be detectable, it may have an effect on the visibility of a detectable primitive. On the third pass, nondetectable primitives are not reported.

During this traversal, graphics control processor also creates data structures in VRAM 112, as described more fully in the copending application of Ebbers et al. Thus, referring to FIG. 7, the graphics control processor 108 maintains an attribute stack 710. Each row 711 of the attribute stack 710 is used to store the state of the machine when an execute structure command (FIG. 6) is encountered during the traversal of a structure. Stack 710 is written to (i.e., pushed) when a given execute structure command is encountered and is read (i.e., popped) when the command has been fully executed. A current pointer (FIG. 7) points to the current row 711 of the stack 710.

VRAM 112 also contains a pick echo area 720, successive rows 721 of which contain information used for echoing picked primitives to the user (e.g., by highlighting the picked primitives). Upon the detection of a geometric pick, the row 711 of the attribute stack 710 pointed to by the current pointer is copied to the next available row 721 in pick echo area 720. Each row 721 of the pick echo area thus contains information used for echoing a particular picked primitive. In the embodiment shown, the pick echo area 720 contains 32 rows 721. A different number of rows, however, could be provided if desired.

The graphics control processor 108 traverses the entire buffer list stored in system memory 104, which contains structure networks similar to the structure network 600 shown in FIG. 6, with the drawing processor 118 as the intended destination. This is done because, in the system 100 shown, shading processor commands do not generate pick interrupts on the graphics control processor 108; therefore, all rendering must be done as if to the drawing processor 118 to build the pick path in system memory 104 and create the pick echo area 720 (FIG. 7) in VRAM 112. Although the drawing processor 118 is the intended destination, no data is sent to the drawing processor because no rendering is required for this pass. This is done to improve performance. The pick module 116 is set up to interrupt the graphics control processor 108 upon detecting a geometric pick so that no data goes past the graphics control processor. Additionally, for processing efficiency during this traversal the clipping boundaries for transformation processor 114 are set to the pick aperture 216.

For all picks, the pick path information is stored in system memory 104, as shown in FIGS. 4-5, and the current row 711 of the attribute stack 710 (FIG. 7) in VRAM 112 is copied to the next available row 721 in the pick echo area 720. This builds a list of the information necessary to redraw all the picked primitives up to a Limit of 32 (the number of VRAM rows 721 allocated for pick save information in the pick echo area 720). The only restriction on this limit is the amount of VRAM storage available. Since the pick echo area 720 is limited to 32 entries 721, the first-pass traversal of the display list in system memory 104 may be terminated prematurely if this limit is reached.

b. Second Pass

As a preliminary to the second pass, the graphics control processor 108 tells the drawing processor 118 to transfer, by a BitBLT operation, pixel data from the first 8 bit planes of pick aperture 216 in background frame buffer 210 to the off-screen save area 218 (FIG. 2). These bit planes of the frame buffer portion corresponding to the pick aperture 216 and the corresponding area in the Z-buffer 122 are then cleared to zero. The visible pick procedure of the present invention preferably uses only the first 8 bit planes in the frame buffer 124, even when additional bit planes are available in a given system, to insure that the procedure will work on minimally configured systems.

The graphics control processor 108 then uses the Z-buffer 122 to write the pick indices of the primitives visible in the pick aperture to the background frame buffer 210 at the location of the pick aperture. The graphics control processor 108 does this by rendering the picked drawing primitives, saved on the first pass in the VRAM pick echo area 720 as described above, to the drawing processor 118 and shading processor 120 with pick module 116 disabled. The graphics control processor 108 forces the pick index to be rendered, not the color indices imbedded in the drawing primitive.

Figure 8:
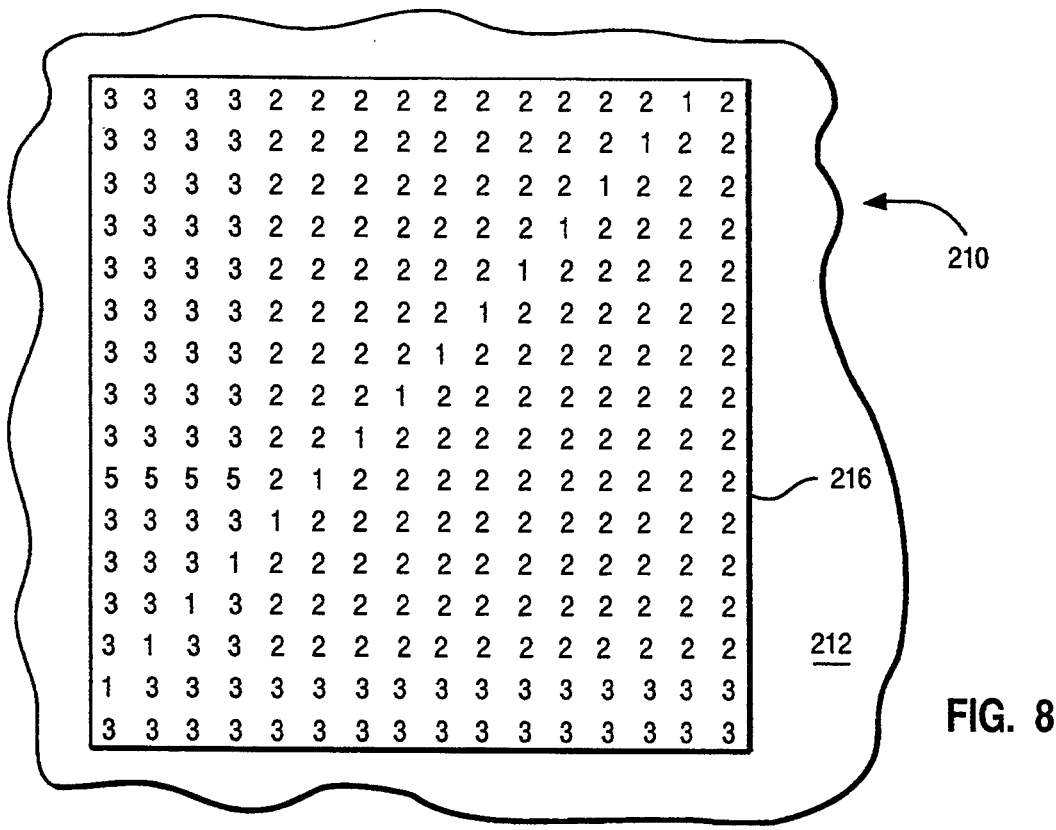
FIG. 8 is a fragmentary view illustrating the contents of the pick aperture portion of the frame buffer after the second pass in one embodiment of the present invention.

At the end of the second pass, the pick aperture 216 will contain the values shown in FIG. 8, which are the pick indices of the primitives 301-303 and 305 that are actually visible in the pick aperture. Although the primitive 304 also passes through the pick aperture 216, it is invisible in the pick aperture because it is hidden by earlier-drawn primitives 301-303. As a result, its pick index is never written to the frame buffer 124.

c. Third Pass

After all picked drawing primitives have been redrawn with the pick index as the color value on the second pass, the graphics control processor 108 sends a special synchronization command down the pipeline 114 to the shading processor 120 and waits for acknowledgment. This ensures that all rendering to the frame buffer 124 has been completed by the shading processor 120.

Figure 9:
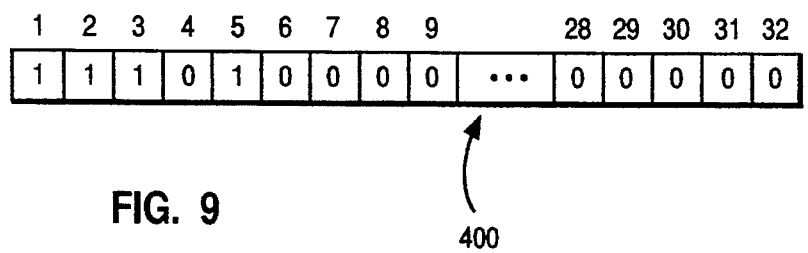
FIG. 9 illustrates the contents of the flag word after the second pass in one embodiment of the present invention.

The graphics control processor 108 then sends a special read pixel command to the drawing processor 118, instructing it to read the pick aperture 216 of the frame buffer 124 and set bits in the 32-bit flag word 400 indicating the pick index values that are visible in pixel memory, as shown in FIG. 9 for the pick index pattern shown in FIG. 8. The flag word 400 is then stored in system memory 104 at the location shown in FIG. 4, immediately preceding the pick path data blocks 401.

The read pixel command also instructs the drawing processor 118 to restore the area of the frame-buffer 124 corrupted by visible pick from the off-screen save area.

The graphics control processor 10B then interrupts the system control processor 102 with "visible pick processing complete".

The system control processor 102 uses the flagword 400 to assemble the proper information to report to the host for the visible pick process. For pick-first mode, the first pick path data block 401 (FIG. 4) with an active flagword bit is reported. For pick-last mode, the last active flagword data bit is used to point to the proper pick path data block 401. And, for pick-all mode, all pick path data blocks 401 with active flagword bits are reported. Preferably, in the pick-all mode the pick path data blocks 401 are packed (i.e., the blocks corresponding to invisible primitives removed) as indicated by the flagword 400.

Additionally, if echo is active, then the graphics control processor 108 begins an echo pass in which all primitives 721 (FIG. 7) found during the first pass of the visible pick traversal and stored in the pick echo area 720 are processed. For each primitive, a check of the flagword 400 determines whether the primitive 721 should be echoed or skipped.

3. Second Embodiment

Figure 7:
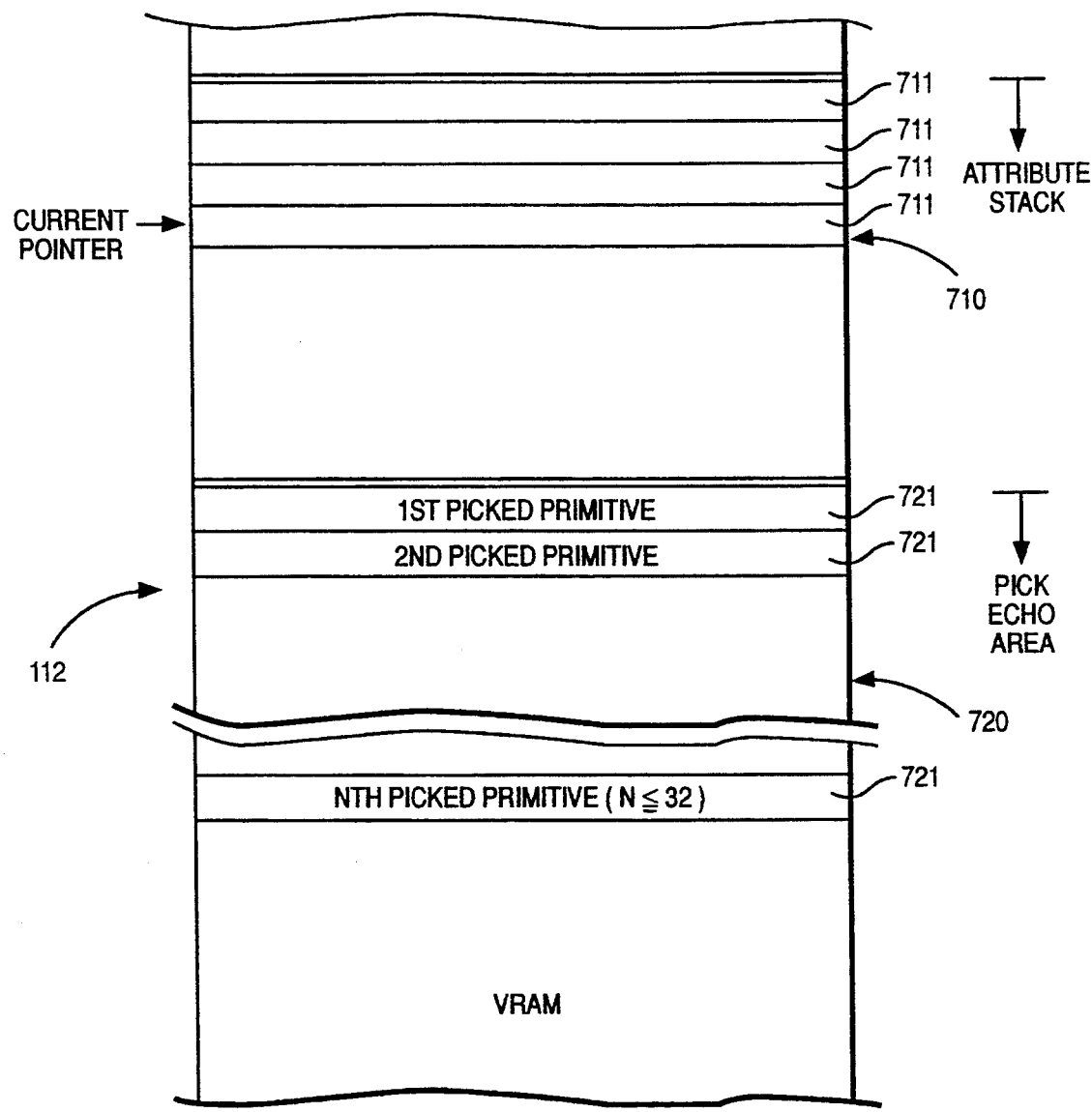
FIG. 7 is a block diagram of the data structures created in the video RAM on the first pass in one embodiment of the present invention.

The first embodiment provides a fast means for including the visibility of entities as a criterion for their detectability. Another approach in which some performance is traded for reduced resource utilization is presented below. The tradeoff is between the maximum number of elements which can be accommodated in the pick-all mode and the time required for a visible pick correlation. The first embodiment uses VRAH 112 (FIG. 1) to record each of the potential candidate visibly picked primitives, in pick echo area 720 (FIG. 7). The second embodiment uses a table of indices 1100 (FIG. 11) for the primitives. Again the procedure involves three passes.

a. First Pass

The system control processor 102 initiates the visible pick procedure by interrupting the graphics control processor 108 with a "start visible pick traversal interrupt", as in the first embodiment, and an address pointer to an area 1100 (FIG. 11) in system memory 104 for storing a table of sorted pick index values 1102. Graphics control processor 108 saves the information necessary to restart traversal for the second and third passes.

On the first pass the graphics control processor 108 builds a structure element index (SEI) table 1000 (FIG. 10) in VRAM 112 (or in system memory 104 if space is unavailable in VRAM 112) as a reference for all drawing primitives that geometrically pass through the pick aperture 216 (FIG. 3), without regard to whether the primitive is visible or hidden by another primitive. The graphics control processor 108 does this by rendering the structure elements to the drawing processor 118 with the pick module 116 enabled and set up so that no data goes to the drawing processor. As noted above for the first embodiment, this is done because shading processor commands do not generate pick interrupts on the graphics control processor 108; therefore, all rendering must be done as if to the drawing processor 118 to build the SEI table 1000. As in the first embodiment, the clipping boundaries are set to the pick aperture 216.

Prior to sending each drawing primitive to the transformation processor 114, a synchronization interrupt with the SEI as data is sent. This is done in the pick tag generation routine which also handles the SEI generation. On the post-formatter synchronization interrupt, the SEI is saved in the current SEI-at-bottom register (not separately shown), which stores the SEI of the primitive currently being handled at the bottom of the transformation pipeline 114. If a pick interrupt occurs for the drawing primitive, the current SEI-at-bottom register is placed into the SEI table 1000 in VRAH 112.

Figure 10:
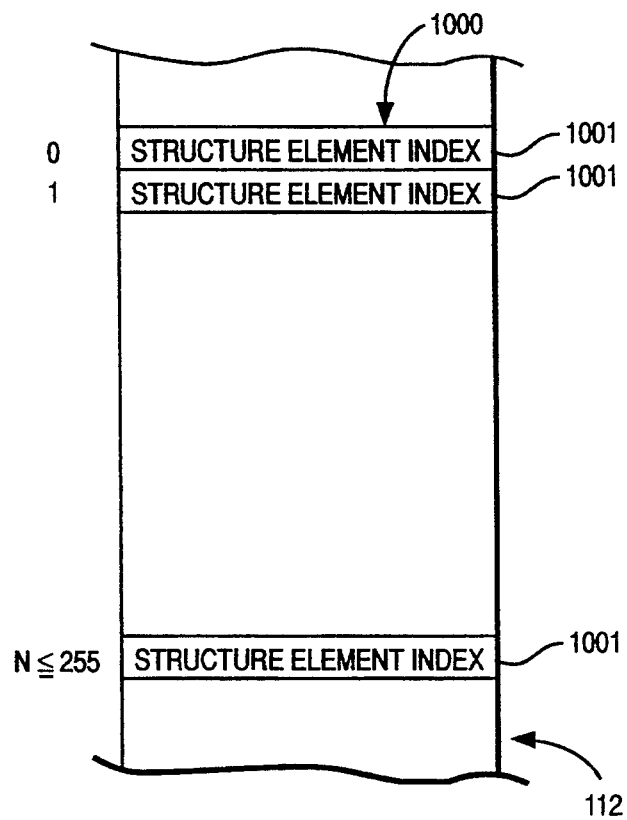
FIG. 10 is a block diagram of the data structure created on the first pass in a second embodiment of the present invention.

The result of the first pass is the creation of an SEI table 1000 (FIG. 10) in VRAM 112 as a reference to all drawing primitives that pass geometrically through the pick aperture 216 (without regard to their ultimate visibility). Each entry 1001 in the table 1000 consists of a structure element index (SEI), identifying a particular structure element of the display list being traversed. Entries 1001 in the SEI table 1000 are in turn assigned consecutive pick indices which, as shown in FIG. 10, range between 1 and M, where M is 255 or less. As explained elsewhere in the specification, this upper limit on M is imposed by the number of bit planes assumed to be available in the frame buffer 124 for storing pick indices. Since the SEI table 1000 is limited to 255 entries 1001, the first-pass traversal of the display list in system memory 104 may be terminated prematurely if this limit is reached. (This theoretical possibility should occur rarely, if ever, in practice.)

b. Second Pass

The second pass is similar to the one in the first embodiment. As a preliminary to the second pass, the graphics control processor 108 tells the drawing processor 118 to transfer, by a BitBLT operation, pixel data from the first 8 bit planes of pick aperture 216 in background frame buffer 210 to the off-screen save area 218 (FIG. 2). These bit planes of the pick aperture 216 and the corresponding area in the Z-buffer 122 are then cleared to zero. As in the first embodiment, the visible pick procedure preferably uses only the first 8 bit planes in the frame buffer 124, even when additional bit planes are available in a given system, to insure that the procedure will work on minimally configured systems. Although this limits the visible pick procedure to 256 pick indices, this limitation far exceeds the number of pick indices typically required.

The graphics control processor 108 then restarts traversal of the original display list (FIG. 6) in system memory 104, using the traversal information saved on the first pass. During this traversal, the graphics control processor 108 uses the Z-buffer 122 to write the pick indices of the primitives visible in the pick aperture 216 to the background frame buffer 210 at the location of the pick aperture. The graphics control processor 108 does this by rendering the picked drawing primitives saved on the first pass to the drawing processor 118 and shading processor 120. The graphics control processor 108 forces the pick index to be rendered, not the color indices imbedded in the drawing primitive.

The SEI is still maintained in the pick tag routine to determine which drawing primitives have passed through the pick aperture 216. Only the drawing primitives whose SEI matches an SEI in the SEI table 1000 will be rendered. The pick index in the highlight registers (not separately shown), used to hold color information that is written to the frame buffer 124, is incremented for each drawing primitive that is rendered.

Upon completion of this traversal, the pick aperture 216 will contain the values shown in FIG. 8, which are the pick indices of the primitives 301–303 and 305 that are actually visible in the pick aperture.

After all picked drawing primitives have been redrawn with the pick index as the color value on the second pass, the graphics control processor 108 sends a special synchronization command down the pipeline 114 to the shading processor 120 and waits for acknowledgment. This ensures that all rendering to the frame buffer 124 has been completed by the shading processor 120.

Figure 11:
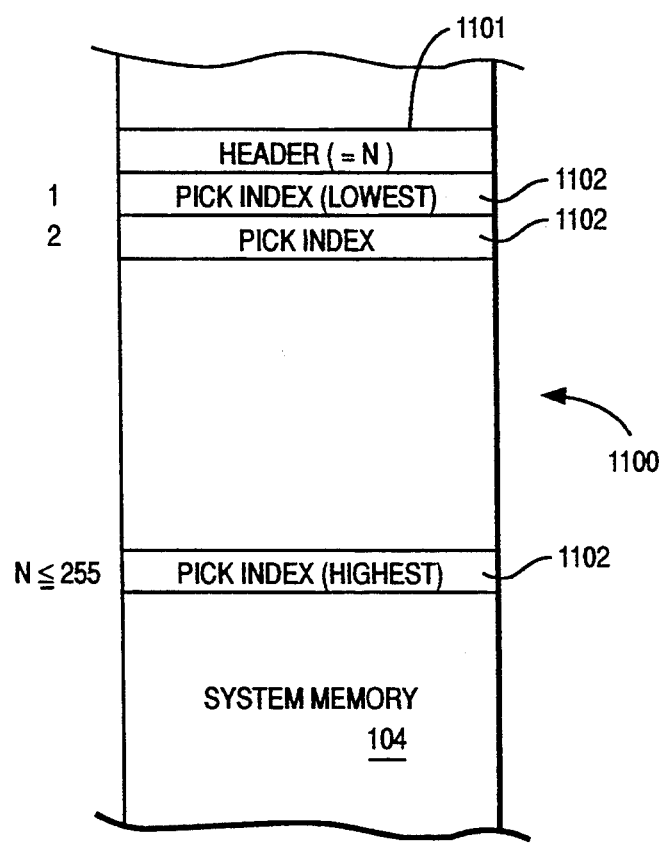
FIG. 11 is a block diagram of the data structure created in system memory on the third pass in the second embodiment of the present invention.

The graphics control processor 108 then sends a special read pixel command to the drawing processor 118, instructing it to read the pick indices stored in the pick aperture 216 of the frame buffer 126, sort the pick indices from lowest to highest (eliminating any multiple instances of the same pick index), and store the sorted pick indices 1101 in the pick index area 1100 (FIG. 11)

of system memory 104. The drawing processor 118 also inserts a header byte 1101 at the beginning of the area 1100 indicating the total number of pick indices 1102.

The read pixel command also instructs the drawing processor 118 to restore the area 216 of the frame buffer 124 corrupted by visible pick from the off-screen save area 218.

c. Third Pass

The graphics control processor 108 starts the third pass pick traversal with pick interrupts enabled and pick correlation mode enabled, so that nothing is passed from the graphics control processor 108 to either the drawing processor 118 or shading processor 120. The structure element index (SEI) table 1000 (FIG. 10) and pick index table 1100 (FIG. 11) are still maintained, but nothing is sent to shading processor 120 or drawing processor 118. When there is a match between the SEI and the pick index being generated in the pick tag routine with the SEI and pick index stored in the tables 1000 and 1100, then it is known that at the top of the transformation pipeline 114 there is a pick. The pick information for this primitive is stored as a pick path data block 401 (FIG. 4) in system memory 104.

For the pick-first mode, only the first pick index 1102 stored in the sorted pick index table 1100 (FIG. 11) needs to be found. For pick-last mode, the last pick index 1102 in the sorted table 1100 indicates the last visible structure element picked. For pick-all mode, all picks are reported.

Upon the completion of the third pass, the graphics control processor 108 interrupts the system control processor 102 with "visible pick processing complete".

4. Summary

Figure 12:
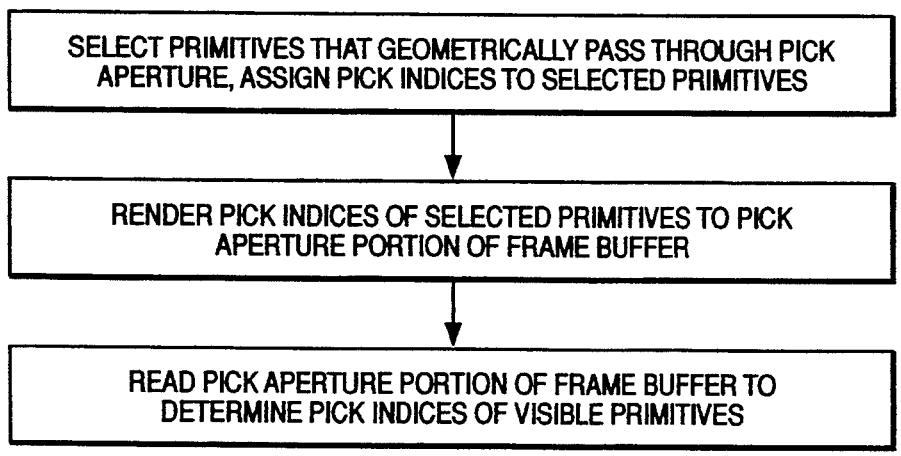
FIG. 12 is a flowchart of the overall sequence of operation.

Both disclosed embodiments use a three-part procedure to generate visible pick information for an application, as shown in FIG. 12. In the first part, a subset of primitives that geometrically pass through the pick aperture, and thus are potentially visible, are selected from the set of primitives stored in the system memory and assigned unique pick indices. In the second part, the selected primitives are rendered to the pick aperture portion of the frame buffer, using the assigned pick indices rather than the normal color values. A Z-buffer is used to eliminate the invisible portions of the selected primitives. In the third part, the pick indices stored in the pick aperture portion of the frame buffer are read to determine which primitives are actually visible in the pick aperture, and appropriate information is returned to the application.

Although the invention has been disclosed in connection with hierarchically arranged primitives, this does not form an essential part of the invention, and other data structures could be used. Also, while the disclosed apparatus employs a particular architecture and apportions the traversal functions among the various components in a particular manner, other architectures could of course be used.

What is claimed is:

1. In a graphics system in which drawing primitives are converted to pixel data for display of said primitives as an array of pixels in a display area of a raster-scan device, said pixel data including a color value representing a desired display color for each pixel associated with a primitive, said system having means for defining a pick aperture within said display area and storage locations corresponding to the pixels within said pick aperture, a method of determining the primitives that are visible in said pick aperture including the steps of:

(a) assigning each of said primitives within said pick aperture an unique identifier, separate from said color value;
(b) for each of said primitives and for each pixel associated with said primitive within said pick aperture:
 (1) generating the unique identifier assigned to said primitive; and
 (2) updating a storage location corresponding to the pixel with said unique identifier; and
(c) reading the unique identifiers stored in said storage locations corresponding to the pixels to determine the primitives that are visible in said pick aperture.

2. A method as in claim 1 in which generated pixel data includes for each pixel associated with a primitive a depth value representing the distance of the corresponding portion of the primitive from a viewpoint, said storage locations being updated with said pixel data if the depth values represent lesser distances from said viewpoint than the depth values currently stored in said locations.

3. A method as in claim 1 in which said primitives are derived from a superset of primitives by selecting those primitives passing through said pick aperture.

4. A method as in claim 3 in which said primitives are assigned said unique identifiers concurrently with their selection from said superset.

5. A method as in claim 3 in which, concurrently with the selection of each of said primitives from said superset, a data block is generated for the selected primitive.

6. A method as in claim 1 in which said storage locations are contained in a frame buffer for storing said array of pixels.

7. A method as in claim 6 in which said frame buffer comprises an active frame buffer portion and an inactive frame buffer portion, said storage locations being contained in said inactive portion.

8. A method as in claim 6 in which the contents of said locations are transferred to a save area before said pixel data containing said identifiers is written to said locations.

9. A method as in claim 8 in which said contents are later restored to said locations.

10. In a graphics system in which drawing primitives are converted to pixel data for display of said primitives as an array of pixels in a display area of a raster-scan device, said pixel data including a color value representing a desired display color for each pixel associated with a primitive, said system having means for defining a pick aperture within said display area and storage locations corresponding to the pixels within said pick aperture, apparatus for determining the primitives that are visible in said pick aperture comprising:

(a) means for assigning each of said primitives within said pick aperture an unique identifier, separate from said color value;
(b) means for generating, for each of said primitives and for each pixel associated with said primitive within said pick aperture, the unique identifier assigned to said primitive and updating the storage location corresponding to the pixels with said identifier; and
(c) means for reading the unique identifiers stored in said storage locations corresponding to the pixels to determine the primitives that are visible in said pick aperture.

11. In a graphics system in which drawing primitives are converted to pixel data for display of said primitives as an array of pixels in a display area of a raster-scan device, said pixel data including a color value representing a desired display color and a depth value representing the distance from a viewpoint for each pixel associated with a primitive, said system having means for defining a pick aperture within said display area and first and second storage locations corresponding to the pixels within said pick aperture, a method of determining the primitives that are visible in said pick aperture including the steps of:

(a) selecting from a set of primitives those primitives passing through said pick aperture;

(b) assigning each selected primitive an unique identifier, separate from said color value and said depth value;

(c) for each selected primitive and for each pixel associated with said primitive within said pick aperture:

(1) generating the unique identifier assigned to said primitive and the depth value associated with a portion of said primitive; and (2) updating the first storage location corresponding to the pixel with said identifier and the second storage location corresponding to the pixel with said depth value if the depth value represents a lesser distance from said viewpoint than the depth value currently stored in said second location; and (d) reading the unique identifiers stored in said first storage locations to determine the primitives that are visible in said pick aperture.

12. In a graphics system in which drawing primitives are converted to pixel data for display of said primitives as an array of pixels in a display area of a raster-scan device, said pixel data including a color value representing a desired display color and a depth value representing the distance from a viewpoint for each pixel associated with a primitive, said system having means for defining a pick aperture within said display area and first and second storage locations corresponding to the pixels within said pick aperture, apparatus for determining the primitives that are visible in said pick aperture comprising:

(a) means for selecting from a set of primitives those primitives passing through said pick aperture;

(b) means for assigning each selected primitive an unique identifier, separate from said color value and said depth value;

(c) means for generating for each selected primitive and for each pixel associated with said primitive within said pick aperture, the unique identifier assigned to said primitive and the depth value associated with a portion of said primitive; and (d) means for updating the first storage location corresponding to the pixel with said identifier and the second storage location corresponding to the pixel with said depth value if the depth value represents a lesser distance from said viewpoint than the depth value currently stored in said second storage location; and (e) means for reading the unique identifiers stored in said first storage locations to determine the primitives that are visible in said pick aperture.

13. A method in a data processing system for determining visible drawing primitives within a pick aperture in a display area of a raster-scan device for displaying pixel data converted from a plurality of drawing primitives as an array of pixels in said data processing system, said method comprising the data processing system implemented steps of:

selecting a number of said plurality of drawing primitives, wherein said selected number of said plurality of drawing primitives are defined as drawing primitives located with said pick aperture;

assigning a plurality of unique identifiers to said selected number of said plurality of drawing primitives; and selecting a number of said plurality of unique identifiers assigned to drawing primitives that are actually visible in said pick aperture.

14. A data processing system for determining visible drawing primitives within a pick aperture displayed in a display area of a raster-scan device for displaying pixel data converted from a plurality of drawing primitives as an array of pixels in a display area of said raster-scan device in said data processing system having, said data processing system comprising:

selection means for selecting a number of said plurality of drawing primitives, wherein said selected number of said plurality of drawing primitives are defined as drawing primitives located with said pick aperture;

assignment means for assigning a plurality of unique identifiers to said selected number of said plurality of drawing primitives; and second selection means for selecting a number of said plurality of unique identifiers associated with primitives that are actually visible in said pick aperture, wherein visible pick information identifying drawing primitives that are actually visible in said pick aperture is generated.

15. The data processing system of claim 14 wherein said second selection means includes identification means for identifying drawing primitives that are actually visible in said pick aperture.

16. The data processing system of claim 15 further comprising an application requesting visible pick information; and data messaging means for sending the generated visible pick information to said requesting application.

* * * * *